Nov. 21, 1944.  J. H. SULZER  2,363,208
CONTROL DEVICE
Filed Nov. 12, 1942  10 Sheets-Sheet 2
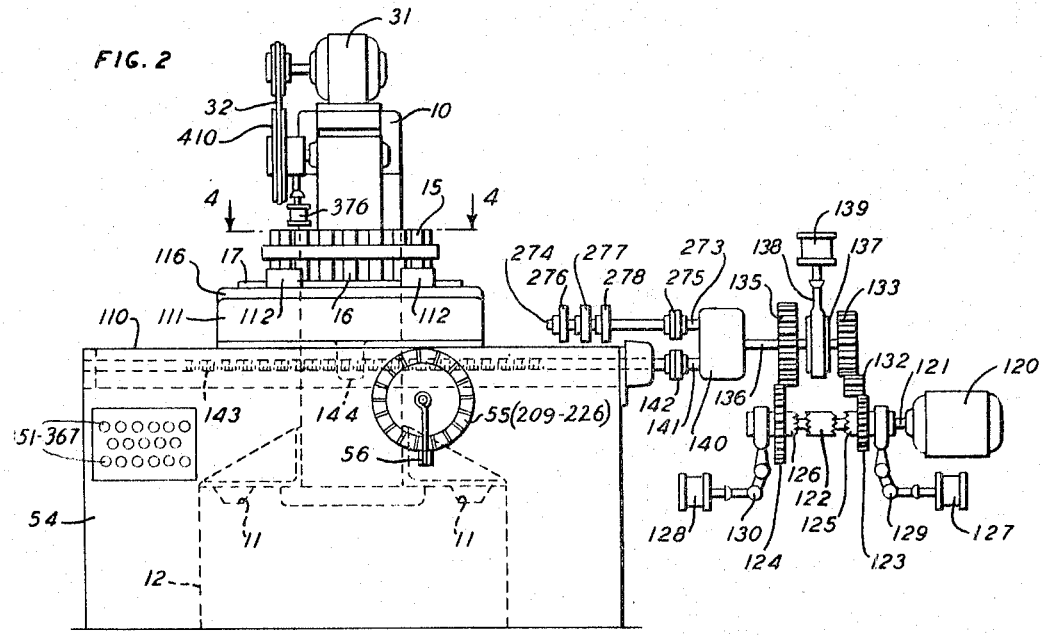
FIG. 2
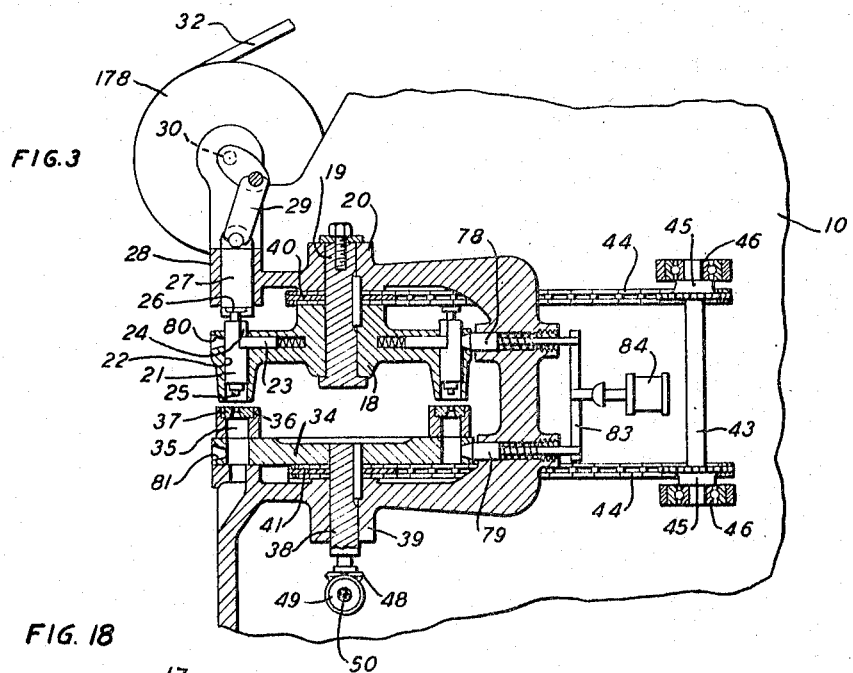
FIG. 3
FIG. 18
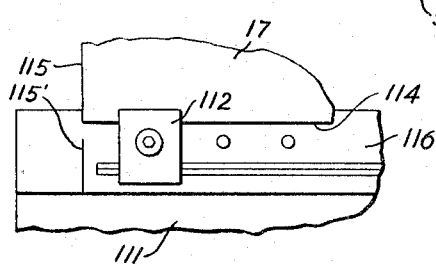
INVENTOR
J. H. SULZER
BY
E. R. Nowlan
ATTORNEY Nov. 21, 1944.   J. H. SULZER   2,363,208
CONTROL DEVICE
Filed Nov. 12, 1942   10 Sheets-Sheet 3
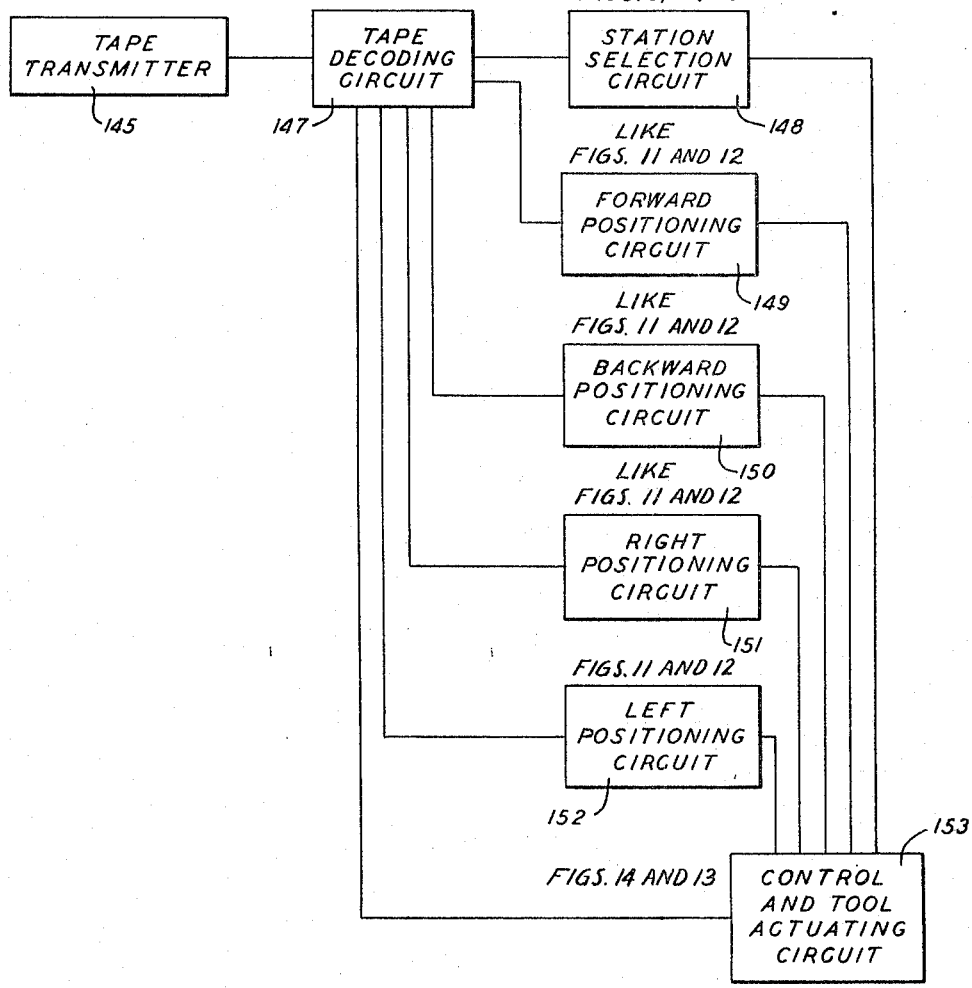
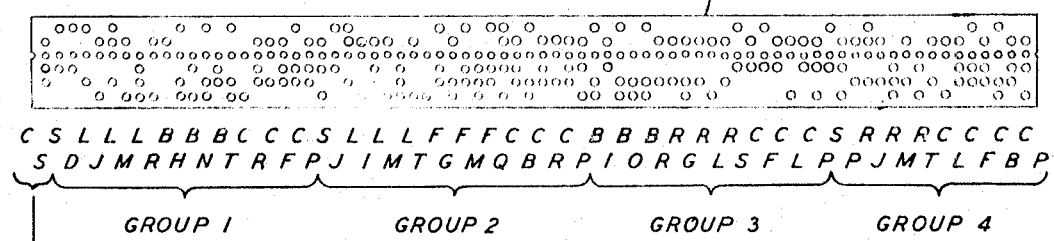
INVENTOR
J. H. SULZER
BY
E. R. Nowlan
ATTORNEY

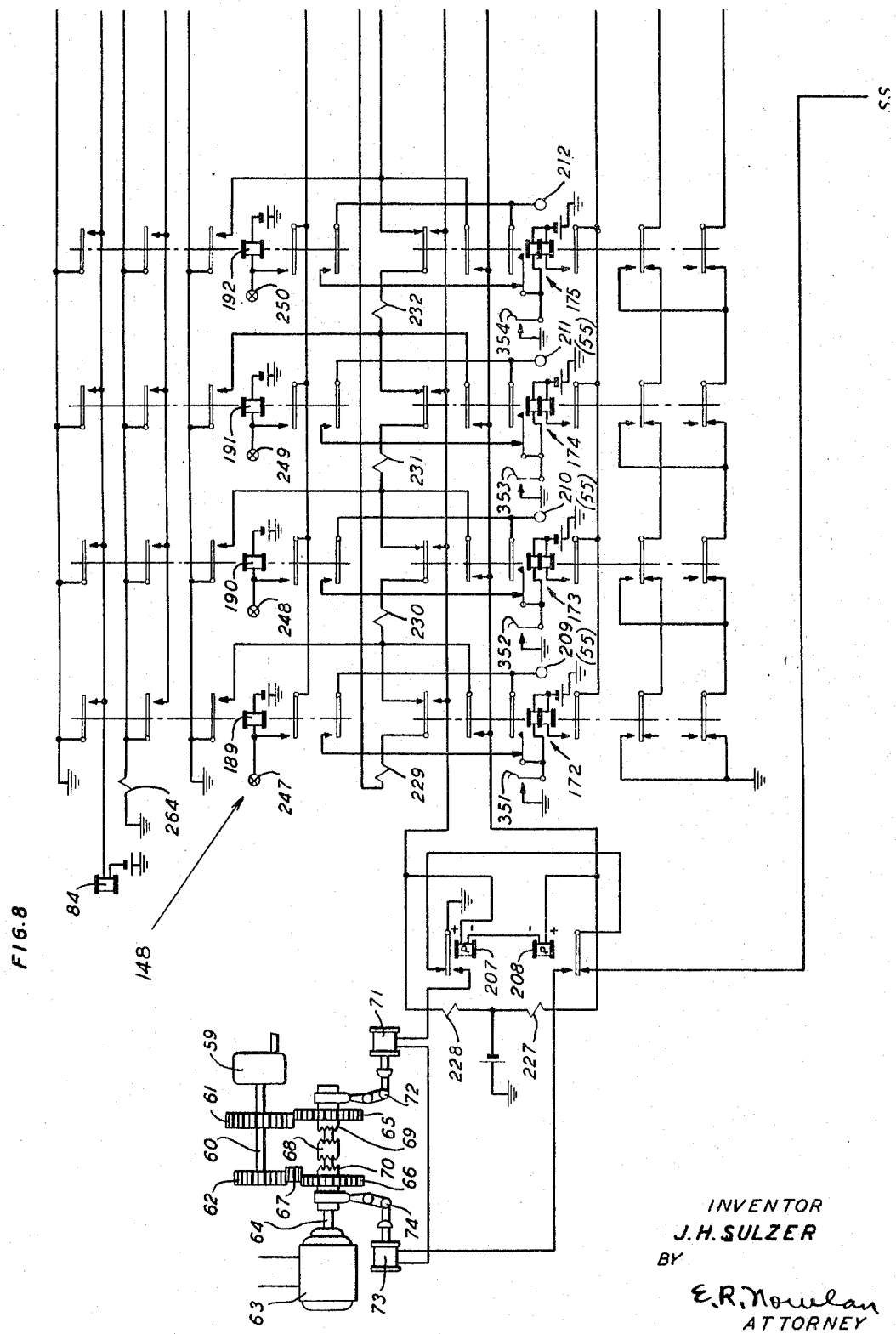

Nov. 21, 1944.   J. H. SULZER   2,363,208
CONTROL DEVICE
Filed Nov. 12, 1942   10 Sheets-Sheet 5

INVENTOR
J. H. SULZER
BY
E. R. Nowlan
ATTORNEY

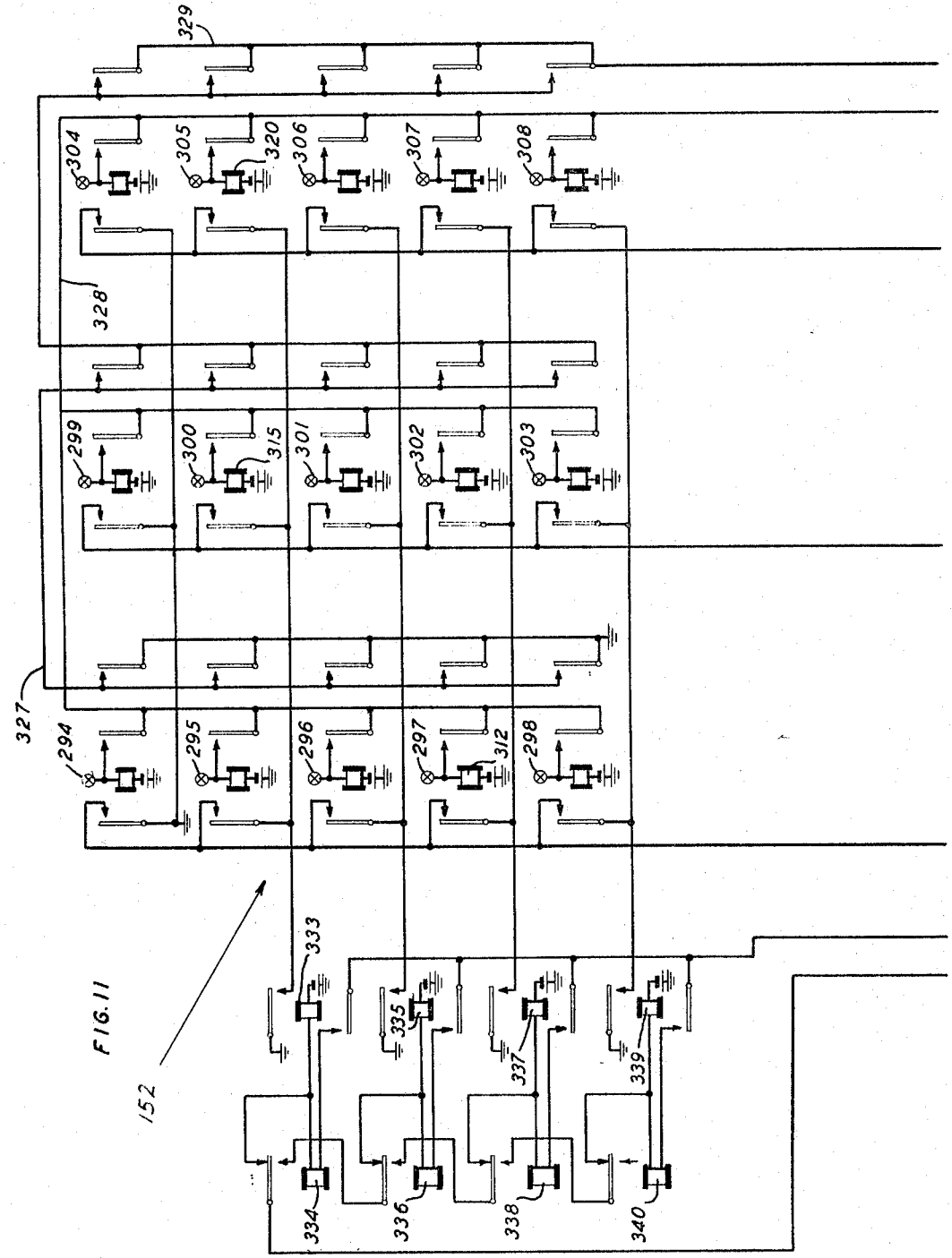

Nov. 21, 1944.          J. H. SULZER              2,363,208
                       CONTROL DEVICE
                    Filed Nov. 12, 1942      10 Sheets-Sheet 7
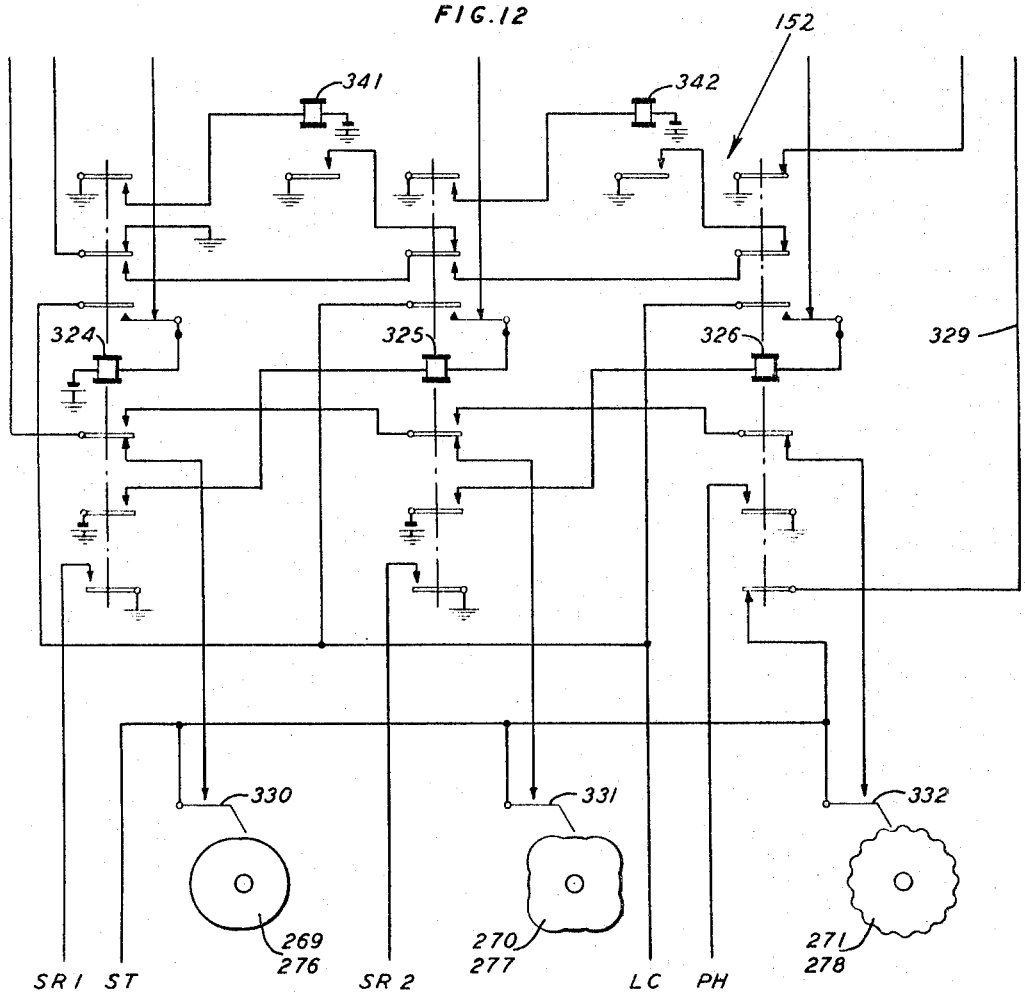
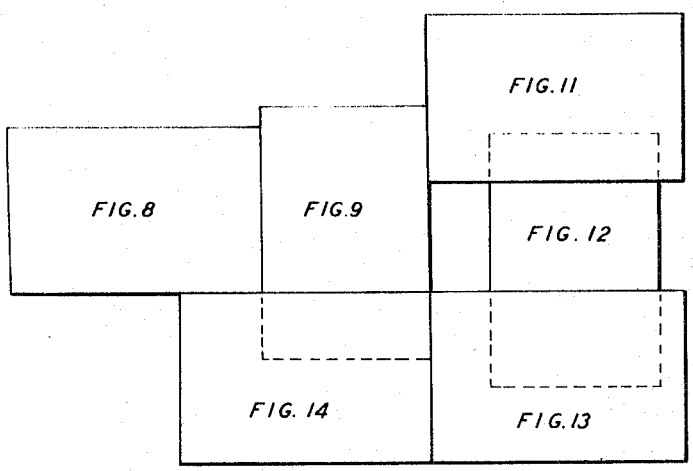
INVENTOR
J. H. SULZER
BY
E.R. Nowlan
ATTORNEY

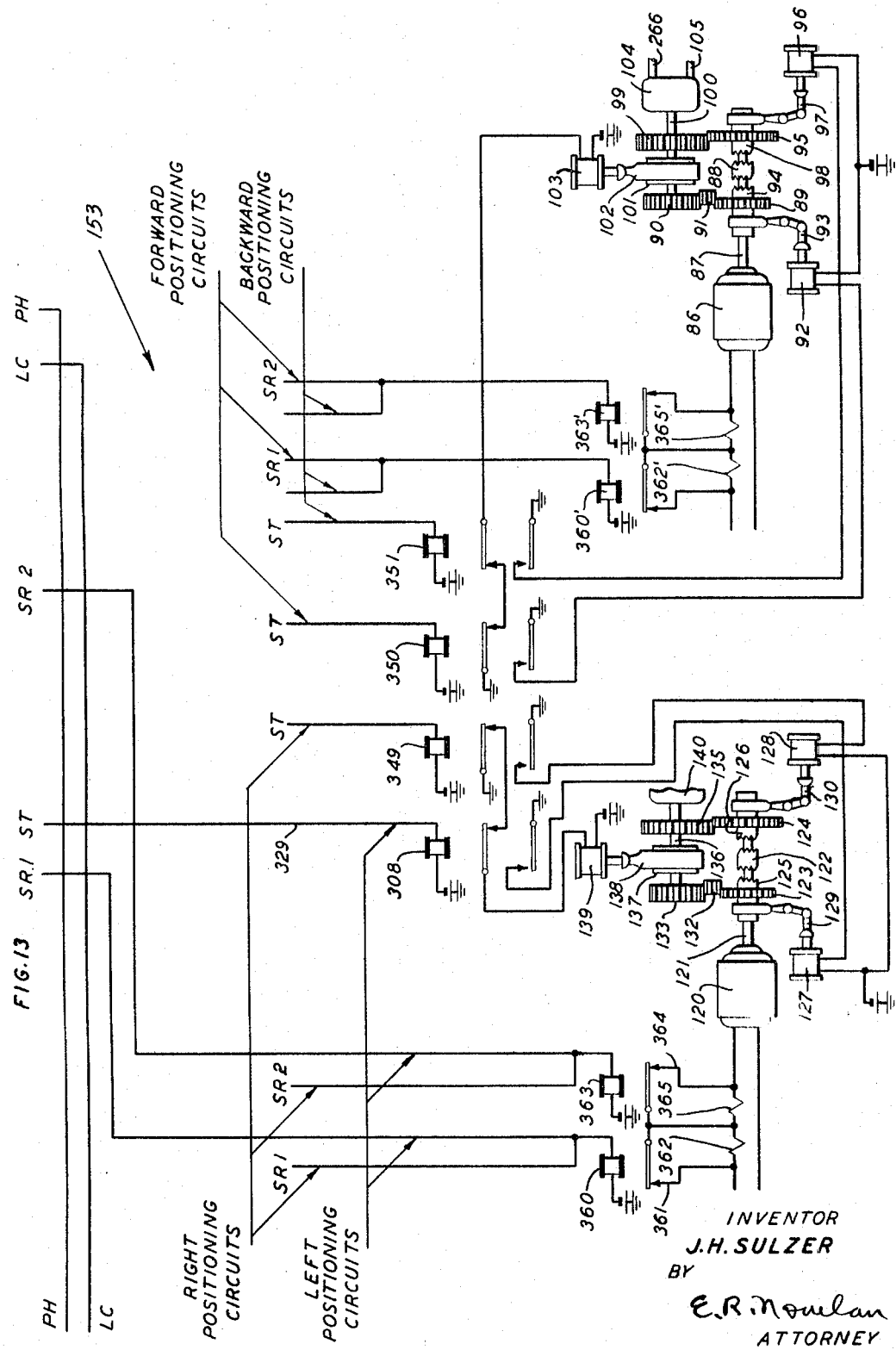

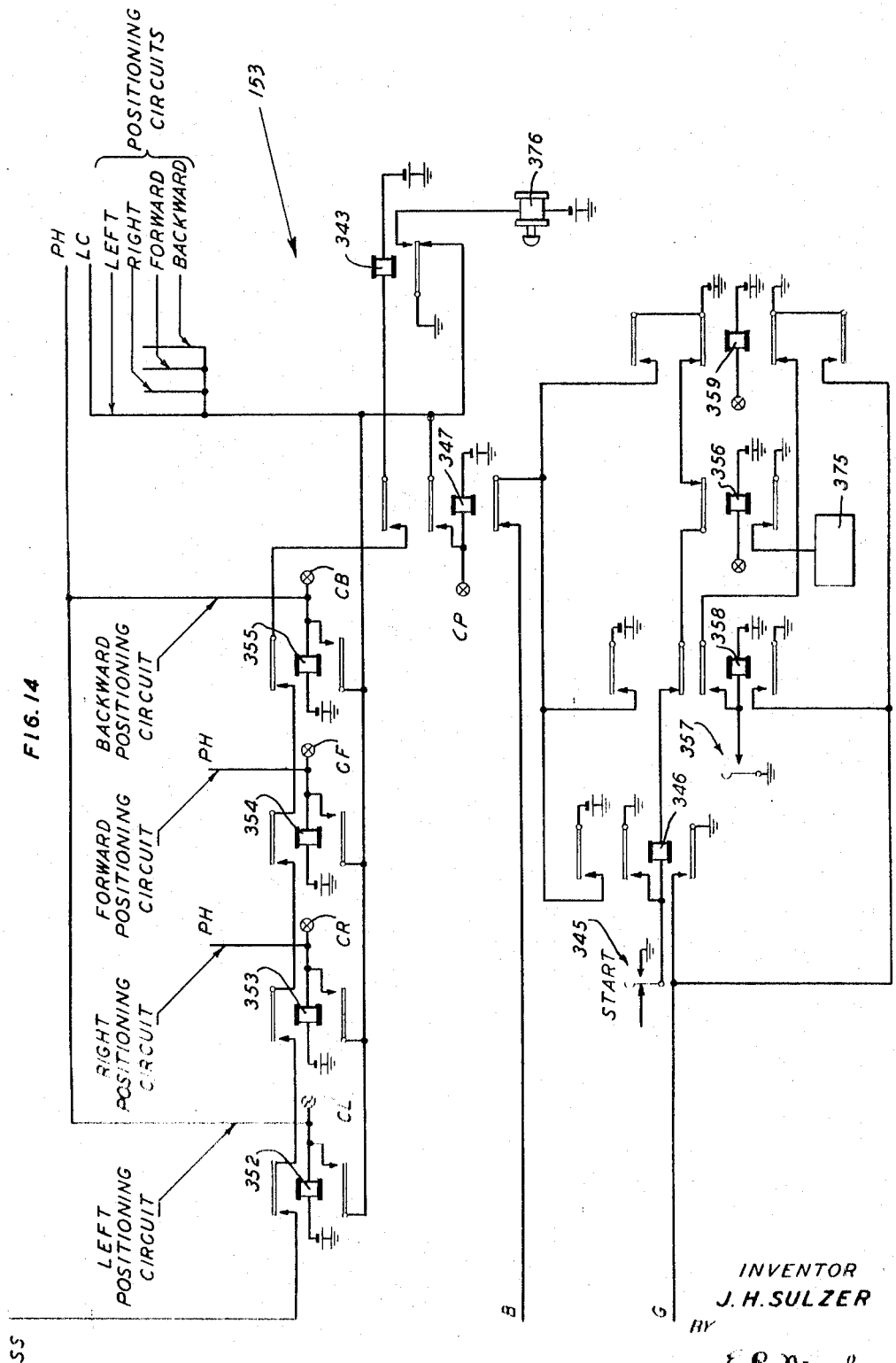

Nov. 21, 1944.    J. H. SULZER    2,363,208
CONTROL DEVICE
Filed Nov. 12, 1942    10 Sheets-Sheet 10
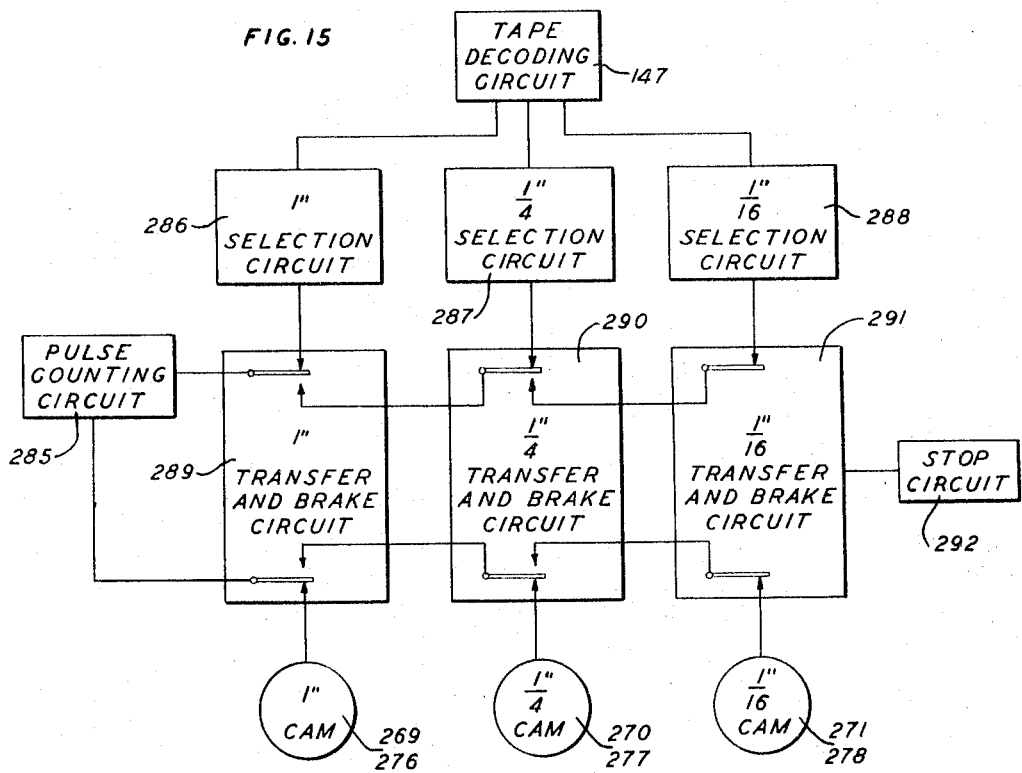
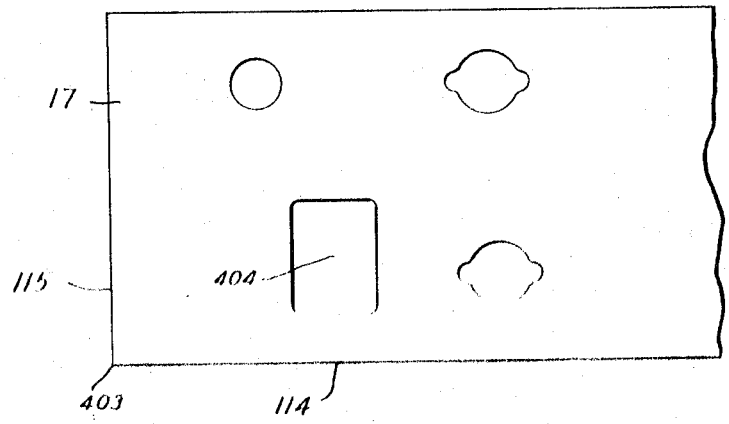
INVENTOR
J. H. SULZER
BY
E. R. Nowlan
ATTORNEY Patented Nov. 21, 1944

2,363,208

UNITED STATES PATENT OFFICE 2,363,208

CONTROL DEVICE

John H. Sulzer, Union Beach, N. J., assignor to Western Electric Company, Incorporated, New York, N. Y., a corporation of New York Application November 12, 1942, Serial No. 465,382

26 Claims. (Cl. 164—115)

This invention relates to control devices, and more particularly to devices for successively and automatically causing actuation of material working machines.

The speed and accuracy in which material working machines may function, particularly those of the multiple operation type, depend upon the number of adjustments to be made in the tool and work supports and the speed and accuracy in which such may be accomplished. The present invention is particularly adaptable in multiple punch presses, wherein any one of a large number of punches may be selected to perform operations at given positions on work, and in such a device there is required of the operator the performance of relative adjustment of the work, the tool and the tool support to cause alignment of a given portion of the work with the selected tool at an operating position. It has been found advantageous to not only perform the suggested operations automatically and in successive accurate order but to cause operation of the press, there being other means to prevent such operation until the given tool for the selected position on the work is in the operating position.

An object of the invention is to provide a control device particularly adapted for material working machines, whereby indexing, or pattern control, means will accurately cause successive and automatic adjustments therein for a given series of operations on work.

With this and other objects in view, the invention comprises a control device for a material working machine having operable material working tools and an adjustable carriage for material movable relative to the tools, the control device including an element adapted for determining the nature of a plurality of operations to be performed by selected ones of the tools at given positions on the material, and other means controlled by the element for successively and automatically initiating the operations.

Other objects and advantages will be apparent from the following detailed description when considered in conjunction with the accompanying drawings, wherein Fig. 1 is a side elevational view of a material working machine embodying the invention, portions of the operating means in this view being shown schematically;

Fig. 2 is a front elevational view of the structure shown in Fig. 1;

Fig. 3 is a fragmentary vertical sectional view of the machine;

Fig. 4 is an enlarged detail sectional view taken along the line 4—4 of Fig. 2;

Fig. 5 is a fragmentary detail view illustrating a portion of the operating mechanism of the machine;

Fig. 6 is a plan view of a short piece of tape properly perforated with definite codes to cause the machine to perform a series of given operations;

Fig. 7 is a block schematic view of the control device;

Figure 9:
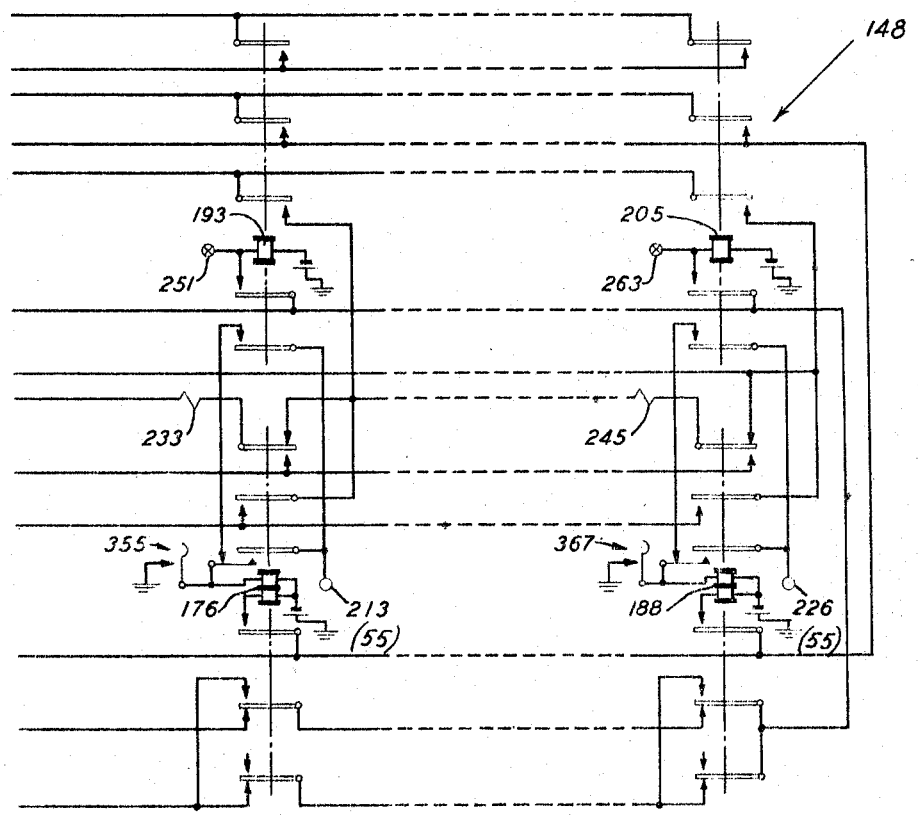
Figure 10:
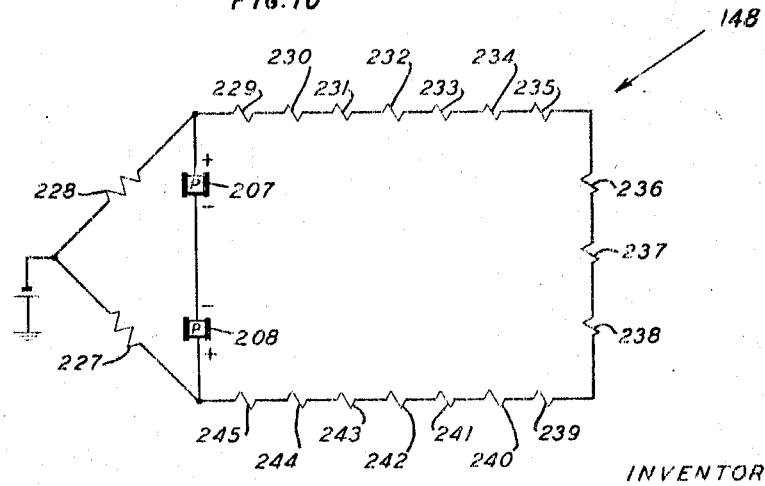

Figs. 8 and 9 combined illustrate circuits under the control of codes in the tape to actuate the tool supporting turret and successively selected tools;

Fig. 10 is a partial simplified circuit of a condition set up by the circuits shown in Figs. 8 and 9 to effect the shortest path of the turret;

Figs. 11 and 12 combined illustrate one set of positioning circuits adapted to control the successive positioning of given points of work relative to the operating position of the machine;

Figs. 13 and 14 constitute the control and actuating circuits of the control device;

Fig. 15 is a block schematic view of the positioning circuits shown in Figs. 11 and 12;

Fig. 16 is a block diagram showing how the station selection circuits (Figs. 8 and 9), one group of the positioning circuits (Figs. 11 and 12) and the control and tool actuating circuits (Figs. 13 and 14) may be placed together to form a complete detail circuit diagram;

Fig. 17 is a fragmentary top plan view of a sample of work upon which four operations have been completed, and Fig. 18 is a fragmentary top plan view of the work support.

Referring now to the drawings, attention is first directed to Figs. 1 to 5 inclusive. The machine selected to illustrate the invention is a multiple press 10 supported in V-grooves 11 of a base 12 for adjustment in the directions of the arrow by suitable means hereinafter described. The machine 10 has an opening or throat 14 in which a turret composed of companion tool supporting units 15 and 16 is disposed, the units being spaced to allow for the positioning of material or work 17 therebetween. The unit 15 has a support 18 mounted for rotary movement on a spindle 19, the latter being journaled at 20. A plurality of tools, in the form of punches 21, is positioned in sockets 22 in the support 18, the formation of their lower ends, indicated at 25, being of such contours as is desirable to perform work or to punch holes of desired sizes and contours in the material 17. Spring pressed plungers 23, mounted in the support 18, enter grooves 24 of their respective tools 21 to serve two purposes, one, to hold the tool at any given position, and two, to prevent rotation of the tool in its socket. The upper ends of the tools 21 are provided with buttons 26 for interconnection with an actuating plunger 27 at what might be called an operating position 28. At this position a crank arm 29, operatively connecting the plunger 27 with a crank shaft 30, serves to connect the plunger with an operating motor 31 through a belt connection 32. The unit 16 includes a support 34 which is provided with a series of apertures 35 at its periphery in alignment with the tools 21, the support being recessed at the apertures, as indicated at 36, to support tools or dies 37, with openings conforming in contour to their respective tools 21. The support 34 is mounted upon a spindle 38 which is journaled at 39.

Means is provided to cause rotation of the supports 18 and 34 simultaneously, to bring selected tools 21 and their companion dies 37 into registration with the operating position 28. This means includes sprockets 40 and 41 mounted upon their respective spindles 19 and 38 and operatively connected to a common shaft 43 through the aid of chains 44 and sprockets 45. The shaft 43 is journaled in bearings 46. Referring back to the spindle 38 (Fig. 4), it will be apparent that a beveled gear 48 is mounted upon the lower end thereof, this gear interengaging a similar gear 49 which is mounted upon a shaft 50.

Figure 1:
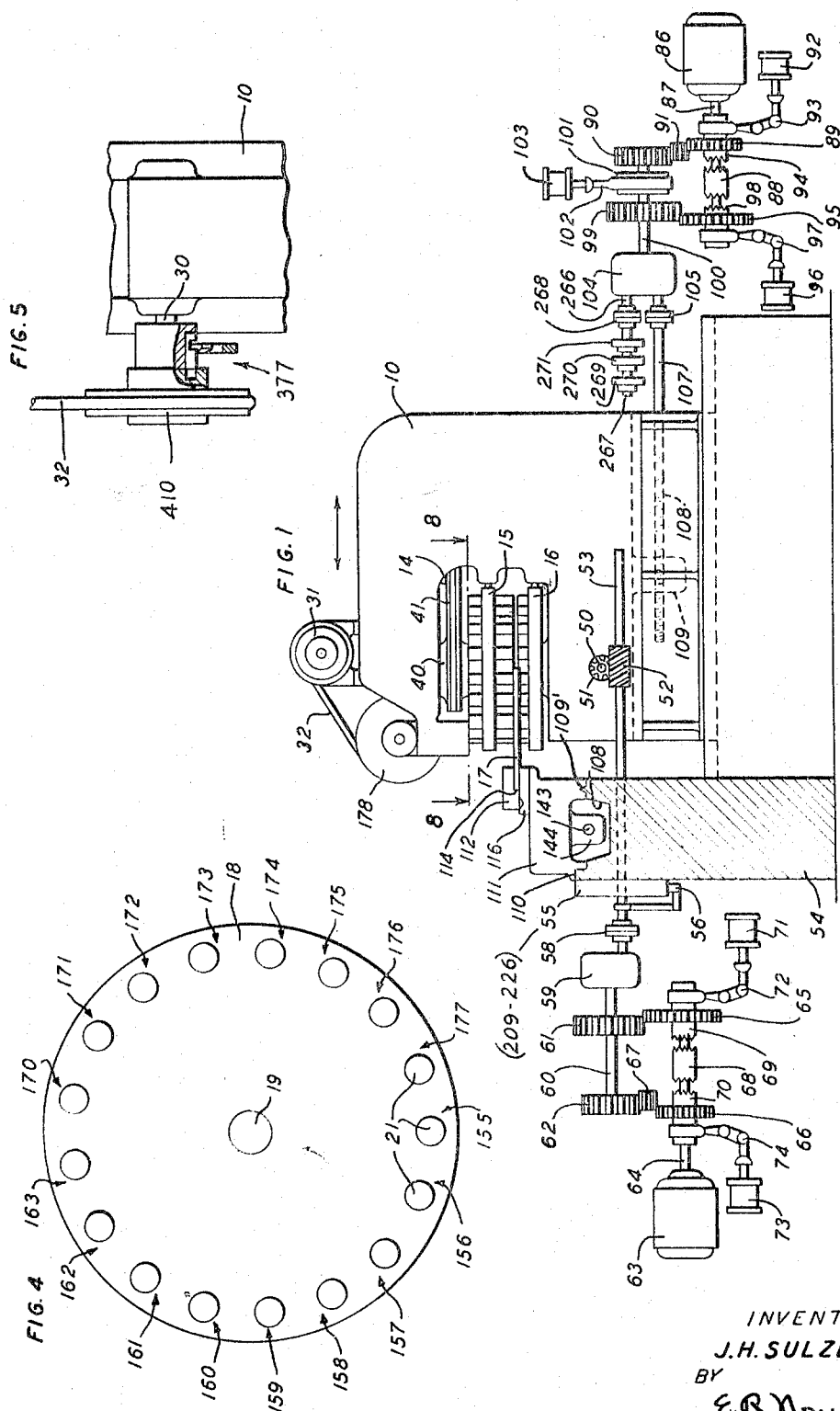

Attention is now directed to Fig. 1, which shows the shaft 50 provided with a worm 51 interengaging a worm gear 52, the latter being disposed upon a splined shaft 53 to permit movement relative to the shaft. The shaft 53 extends forwardly through suitable bearings (not shown) in a vertical support 54. Upon the forward end of the shaft 53, a commutator 55, having a contact for each tool position, is mounted and provided with a suitable brush 56 for purposes hereinafter described. See contacts 209—213, 226 in Figs. 2, 8 and 9. The shaft 53 is connected through a coupling 58 to a speed reducing unit 59. A shaft 60 coupled with the output end of the unit 59, has gears 61 and 62 mounted thereon. A motor 63, having a shaft 64, is adapted to drive the gears 61 and 62 in their respective directions and, through the unit 59, cause rotation of the shaft 53 in either direction. This means includes a gear 65 rotatably mounted upon the shaft 64 and disposed in interengagement with the gear 61. A gear 66 is also rotatably mounted upon the shaft 64 and, through an idler gear 67, is adapted to rotate the gear 62. A clutch element 68, fixedly mounted upon the shaft 64, is adapted for engagement with a clutch member 69 to operatively connect the motor shaft to the gear 65 or for engagement with a clutch member 70, to operatively connect the gear 66 through the gear 67 to the gear 62. The gear 65, with its clutch member 69, may be moved into operating position with the clutch element 68 through the energization of a solenoid 71 and its connecting mechanism 72. A solenoid 73, through its connecting mechanism 74, is adapted to move the gear 66 for operative engagement with the clutch element 68 through its member 70.

With this mechanism control circuits may cause energization of the motor and, through the selected energization of either solenoid 71 or 73, cause movement of the tool supports 18 and 34 in either direction to present a selected tool and its associated die at the operating position.

Means is provided to lock the supports 18 and 34 in any of the selected positions and to unlock the supports for the automatic selection of another tool and die. This means includes spring pressed plungers 78 and 79 mounted for movement toward their respective supports 18 and 34, where their cone-shaped ends are receivable in any of a plurality of conical recesses 80 and 81 which are positioned adjacent the tool sections. However, the recesses at their respective tool and die locations function to locate the diametrically opposed tool and die at the operating position. If there should be an odd number of tools and dies, then the recesses 80 and 81 would be interposed between the locations of the tools and dies in their respective supports. The plungers 78 and 79 are connected by a common bar 83 which is operatively connected to a solenoid 84, the actuation of which will draw the plungers rearwardly against the force of their springs to remove them simultaneously from the recesses 80 and 81. Thus the solenoid 84 will function prior to the operation of the motor 63 to release the supports 18 and 34 for an adjustment, the plungers being held outwardly in this manner until after the adjustment has been completed, after which the solenoid will be deenergized, allowing the plungers to find their new recesses 80 and 81 and then lock the selected tool and die at the operating position.

Attention is now directed to the means for moving the machine 10 on its base 12, as shown in Fig. 1 of the drawings. The power means for bringing about this adjustment includes a motor 86 energized, through the control means, to rotate its shaft 87 which has a clutch element 88 fixedly mounted thereon. At one side of the element 88, a gear 89 is rotatably mounted upon the shaft 87, this gear being operatively connected to a gear 90 through an intermediate gear 91. Means including a solenoid 92 energized through the control means, is operatively connected through mechanism 93 to the gear 89, to cause movement of the gear for interengagement of a clutch member 94 thereof with the clutch element 88, to thus operatively connect the gear with the shaft 87. Another gear 95 is rotatably mounted upon the shaft 87 and is adapted for movement through the energization of a solenoid 96 and its connecting means 97, to operatively engage a clutch member 98 thereof with the clutch element 88. The gear 95 interengages a gear 99 which, with the gear 90, is fixedly mounted upon a shaft 100. Means is provided to stop rotation of the shaft 100 when driven by either set of gears 89—90—91 or 95—99 upon deenergization of the motor 86. This means includes a brake drum 101 mounted upon the shaft 100 and a brake band 102 suitably mounted for engagement with the drum 101 when a solenoid 103 is energized, deenergization of the solenoid causing releasing of the braking means. The shaft 100 is operatively connected to the input side of a speed reducing unit 104, an output 105 of which is operatively connected, through the aid of a coupling 106, to a threaded shaft 107. The shaft 107 has its threaded portion 108 extending through a nut 109 which is a fixed part of the machine 10, it being apparent that rotation of the shaft 107 in either direction will cause movement of the machine 10 upon its base relative to the support 54.

The support 54 is in cross-section of the contour shown in Fig. 1, the upper end being recessed at 108 and provided with tracks 109 and 110 for the longitudinal movement of a carriage or work support 111. In the present instance the work support includes a plurality of clamps 112 adapted to clamp the work 17 in a given position thereon. The work may be a panel or sheet of material having a finished longitudinal edge 114 (Figs. 1 and 17) and a finished lateral edge 115, the former being accurately located through the structures of the clamps 112 while the latter may be accurately located through the aid of a locating point or line 115' (Fig. 18).

Means is provided to adjust the carriage or work support relative to the units 15 and 16. This means includes a structure identical with that for adjusting the machine. In other words, a motor 120 when energized drives a shaft 121 to drive a clutch element 122 to drive either gear 123 or 124 through interengagement with their clutch members 125 or 126 respectively with the element 122. These gears are brought into operative positions with the clutch element 122 through the energization of their respective solenoids 127 and 128 and their connecting means 129 and 130. The gear 123, through an idler gear 132, is adapted to drive a gear 133, while the gear 124 is adapted to drive a gear 135, these gears 133 and 135 being mounted upon a common shaft 136 which is also provided with a brake drum 137 and an associated brake band 138 under the control of a solenoid 139. The shaft 136 is connected to the input side of a speed reducing unit 140, an output end 141 of which is connected, through a coupling 142, to a threaded shaft 143. The shaft 143 extends through a threaded nut 144 (Figs. 1 and 2) which is integral with the carriage 111, and through this mechanism the carriage may be moved in either direction through the energization of the motor 120 and the selection of either group of gears 123—132—133 or 124—135.

Attention is now directed to Fig. 7, which is a schematic circuit showing the preferred embodiment of the control device. Reference numeral 145 indicates a tape transmitter unit which may be of the commercially known type, particularly of the type disclosed in Patent 2,328,750 to Robert K. Smith and John H. Sulzer, issued September 7, 1943. This unit is adapted to receive tape of the type shown at 146 in Fig. 6, which is similar to the well known printing telegraph tape. The tape is punched in two-letter codes through which circuits are controlled to complete various desired functions of the material working machine. The tape may then be termed a control element adapted for determining the nature of a plurality of functions of the machine and to cause, through associated circuits, the carrying out of these functions. Associated with the tape transmitter unit is a tape decoding circuit 147, and from this circuit, through the function of the element or tape, other circuits 148, 149, 150, 151, 152 and 153 are caused to function. The tape decoding circuit 147 is also specifically disclosed in the above application of Messrs. Smith and Sulzer. Therefore, in view of the fact that the tape transmitter circuit and the tape decoding circuit are necessary parts of the invention but are not specifically claimed, it is thought that schematic illustrations of these circuits would be sufficient for a clear understanding of the invention and would not hide the true invention, which would be true if specific disclosures of these circuits were made. For a complete understanding of these circuits, attention is directed to "Tape transmitter," page 30, line 6 et seq. and "Tape recording circuit," page 31, line 19 et seq. of the above mentioned application; also Figs. 13 to 16 inclusive of the drawings of this application. The circuit 148 (Figs. 7, 8, 9 and 10) controls the mechanism for selecting the tool 21 and associated die 37 for the given successive operations, as well as the functioning of the plungers 78 and 79. The circuit 149 (like Figs. 11 and 12) controls the forward movement of the machine, while the similar circuit 150 functions to move the machine rearwardly. In a similar manner the circuit 151 functions to move the carriage supporting the work to the right (Fig. 2), while the circuit 152 (Figs. 11 and 12) functions to move the carriage to the left, and finally the circuit 153 which may be called the master control circuit, functions after the completion of the other circuits 148 to 152 inclusive, which may all or a part of them function to condition the machine for a definite operation to cause finally the actuation of the selected punch. The circuits 149 to 152 inclusive are substantially identical in every detail and function, except for the controlling effect of the element 146, for controlling the circuits separately and the units which they cause to function. Thus with this arrangement of circuits leading from the tape transmitter and through the tape decoding circuit, the supports 18 and 34 for the tools may be moved in either direction to present a set of tools for the next operation at the operating position, functioning also to release the plungers to unlock the turret or supports prior to the adjustment thereof and release the plungers for locking engagement after the said adjustment has been completed. At the same time certain of the circuits 149 to 152 inclusive may function depending upon the position of the point in the work which is to be brought into registration with the operating position, which functions depend upon the code in the tape as to whether the machine is moved forwardly or rearwardly and the distance of movement thereof as well as the direction and distance of movement of the carriage.

As a definite example of a panel or strip of material 17 which is to receive punching operations at given positions thereon, attention is directed to Fig. 17. It is important that the material 17 have at least two locating edges, for example a forward edge 114 and a left side edge 115. By the aid of these edges the material is mounted on the carriage 111 through the aid of the clamps 112 and the locating line 115'. With the material located at a given position on the carriage, it is possible, through the control device, to adjust the carriage to the right or to the left measured distances and to simultaneously, if so desired, cause adjustments of the machine to locate a given point of the material at the operating position 28 of the machine. Also, through the aid of the control device, a selected tool may be moved from any given position where it may have been present to the operating position. As a definite example, which will be hereinafter described through the functioning of the control means, let it be assumed that a point 403, representing the forward left hand corner of the material, is aligned with the operating position, and it is desirable to bring a point 404 of the material to a position in alignment with the operating position 28 of the machine for the first operation on the material. It is necessary that the carriage 111 supporting the material move to the left, for example three and five-sixteenths inches (3 5/16") and that the machine be moved rearwardly one and nine-sixteenths inches (1 9/16"). To bring this about, that is the two adjustments, one of the carriage and the other of the machine, to locate the point 404 at the operating position, a given series of codes must be present in the tape. Also, to select the tool for punching the hole illustrated at this position, other codes must be present in the tape to bring about the necessary adjustment of the turret. These codes made be intermingled so that the plurality of adjusting operations may be performed simultaneously if so desired.

Attention is now directed to Fig. 6, where the portion of tape 146 shown illustrates successive codes adapted for causing the functioning of the station selection and positioning circuits together with other circuits necessary for the complete cycle of operation of the machine including the various adjustments necessary. These codes are divided into groups, one for each perforation or cycle of operation of the machine. The first two-letter code CS conditions the control circuit or device. The next code SD actuates the station selection circuit 148 to select the tool for punching the hole shown at 404 and to move it into the operating position 28. The LJ, LM and LR codes combined cause functioning of the left positioning circuit 152, to move the carriage three and five-sixteenths inches (3 5/16") to the left. The LJ code controls movement of the carriage three inches (3"), the LM code one-quarter inch (1/4") and the LR code one-sixteenth of an inch (1/16"), their combined control limiting the movement of the carriage three and five-sixteenths inches (3 5/16"). In a similar manner and by the same type of circuit, the BH, BN and BT codes control the movement of the machine back or rearwardly one and eleven-sixteenths inches (1 11/16"), the BH code controlling movement for one inch (1"), the BN code for one-half inch (1/2") and the BT code for three-sixteenths of an inch (3/16"). Codes CR and CF control by-pass circuit arrangements to complete the actuating circuit after the backward and left positioning circuits have functioned. At this point the CP code may function to cause operation of the selected punch at the operating position. This completes the one cycle of operation of the machine but not a cycle of the operation under the control of the tape, as successive adjustments and selections may be made and caused to follow in a given order. At the present time, after the completion of the one group of codes, the next group of codes will start the functioning of possibly the same or other circuits. If the tool selected for the first operation should be used in the next operation, then there would be no adjustment of the turret. However, in the present illustration a different tool is to be selected to perform work at another position on the material. The next group of codes present in the tape moves the carriage two and seven-sixteenths inches (2 7/16") further to the left, while the forward positioning circuit under the control of the codes in the tape moves the machine forwardly one-quarter of an inch (1/4"). These operations may be performed simultaneously with each other and also with the adjustment of the turret to move the next selected tool to the operating position. In other words, the first operation (by this it is meant the first tool operation on the material) is made at a position selected from a given point, namely the point 403, while the successive punching operations are performed at points on the material which have been moved measured distances from their respective succeeding points.

Considering first the station selection circuit 148, attention is directed to Figs. 8, 9 and 10. The circuits in these figures control the selection of the tools which, as previously stated, may have varying contours to punch holes of various sizes and shapes in the work. The contour of the holes is not as important as the location of the sets of tools and the manner in which they are brought to the operating position. Therefore, in Fig. 4 a top plan view of the unit 15 is shown and reference numerals 155 to 171 inclusive indicate, not the tools, but their positions. Therefore, with the tool location 155 at the operating position, any of the other sets of tools 156 to 171 inclusive may be moved to the operating position and in the shortest possible direction through the circuits shown in Figs. 8, 9 and 10.

Normally, the relays shown in Figs. 8 and 9 are in their unoperated positions. Of these relays, those having reference numerals 172 to 188 inclusive respectively correspond to the tool locations 155 to 171 inclusive (Fig. 4). It will be noted that dot and dash lines connect circuits associated with the relays 176 and 188, the intermediate relays 177—187 inclusive and their associated elements not being shown. The circuit arrangement for the missing relays 177—187 inclusive is the same as those shown and it is believed that with the circuits shown a clear understanding of the invention may be had. Before starting the automatic selection of a set of tools through the control of the tape, it is necessary that the relay of the chain 172 to 188 inclusive which corresponds to the tool location at the operating position 28, be operated. When any tool location 155 to 171 inclusive is in the operating position, its corresponding commutator terminal of the series of terminals 209 to 226 inclusive, is grounded. The terminals 209 to 226 inclusive are electrically connected to their respective contacts, in the commutator 55 (Figs. 1 and 2), which are adapted for electrical connection with the brush 56 when their respective tool location is at the operating position. Therefore, the relay of the 172 to 188 inclusive series which corresponds to the tool location which is resting at the operating position, must be manually operated at the start of each cycle of operation of the tape loop. This is accomplished by means of the keys 351 to 367 inclusive associated with the windings of each of the relays 172 to 188 inclusive provided for this purpose.

Assuming that tool location 171 is resting in the operating position, the key 367 will momentarily be operated by the attendant. This will cause relay 188 to operate on its upper winding and lock to ground on the commutator terminal 226. Relay 188 operated, connects the resistances 227 to 245 inclusive and the windings of relays 207 and 208 together to form the circuit shown in Fig. 10. Relay 188 also provides a locking circuit through which lower contacts for locking relays 189 to 205 inclusive when operated. When the tape decoding circuit sends a ground impulse to one of code points 247 to 263 inclusive, for example code point 250, relay 192 will operate, and when operated locks the locking path controlled by the two lowermost sets of contacts of relays 172 to 188 inclusive. This locking path is maintained as long as only one of relays 172 to 188 inclusive is operated. When two of the relays 172 to 188 inclusive become operated, this locking path is opened and any relay, in the 189 to 205 inclusive relay series, releases. Relay 192 also connects ground to actuate the turret locking pin solenoid 84. This relay 192 supplies ground through resistance 264 to lock relay 188 operated. It also supplies ground to the resistance circuit comprising resistances 229 to 245 inclusive at the point between resistances 232 and 233. Therefore, the resistance path comprising resistances 229 to 232 inclusive has less resistance than the resistance path comprising resistances 233 to 245 inclusive. In this instance, relay 207 will operate and actuate its associated solenoid 71 to cause the motor 63, through the gears 65 and 61, and the clutch members 68 and 69 to operate the turret. As the turret rotates, ground is removed from commutator terminal 226 but relay 188 does not release, as it is being held on its lower winding under control of ground furnished by relay 192. When the turret commutator reaches terminal 212, relay 175 will operate on its upper winding through the circuit furnished by the lower contacts of relay 192. At this time there are two relays in the 172 to 188 inclusive group operated, namely 188 and 175. Therefore, the locking circuit for relay 192 is opened by the lower contacts of 175 and 188 as previously described. The relay 192, therefore, is released, which removes the ground from the circuit resistances 232 and 233, and relay 207 releases. When relay 207 is released, the solenoid 71 is deenergized, releasing the clutch 68—69, and the turret stops at this position. Relay 192, in releasing, also causes deenergization of solenoid 84 to allow the turret locking pins to assume their locking position. The relay 192 on releasing, causes releasing of relay 188, relay 175 staying operated from ground on commutator terminal 212.

If, however, the tape decoding circuit operated a relay which connected ground between resistances 237 and 238 instead of between resistances 232 and 233, relay 208 would operate in place of relay 207. The connection of ground by the operation of any relay 189 to 205 inclusive to any resistance 229 to 245 inclusive forms the simplex bridge circuit of Fig. 10. As there will always be an odd number of resistances in Fig. 10, either relay 207 or 208 will operate depending in which direction the bridge is unbalanced. At this unbalanced condition always corresponds to the relationship of the tool location under the operating position and the next tool location desired, the correct relay, either 207 or 208, will operate to rotate the turret so that the next tool location desired is moved into the operating position in the shortest possible direction.

Attention at this time is directed to the adjusting mechanism for the machine 10, the speed reducing unit 104 of which has a second output 265 which is operatively connected to a cam shaft 267 through the aid of a coupling 268. On this cam shaft three cams 269, 270 and 271 are mounted. A similar structure is provided for the mechanism moving the carriage 111 (Fig. 2). In this structure it will be noted that the speed reducing unit 140 is provided with another output 273 which is connected to a cam shaft 274 through the aid of a coupling 275, there being mounted cams 276, 277 and 278 thereon. The cams 269, 270 and 271 are respectively identical to the cams 276, 277 and 278. These cams are shown in detail in Fig. 9. By viewing Fig. 9, it will be apparent that the cam 269—276 has one high point, the cam 270—277 having four high points 281, while the cam 271—278 has sixteen high points 282. The reference numerals for both sets of cams have been applied to the single set of cams shown in this figure, for the reason that the circuits under the control of these cams are identical for the circuits 149 to 152 inclusive shown schematically in Fig. 5. Therefore, a specific description of the circuit in Fig. 9 regarding one of the adjustments is believed sufficient for a clear understanding of both adjustments of the machine forward and backward and both adjustments of the carriage to the right and to the left.

That the positioning circuits shown in Figs. 11 and 12 may be more readily understood, a schematic illustration of these circuits is shown in Fig. 15. The controlling portion of this group of circuits includes what might be termed a pulse counting circuit 285. In the embodiment shown, other circuits including a one inch (1") selection circuit 286, a one-quarter of an inch (¼") selection circuit 287 and a one-sixteenth of an inch ($\frac{1}{16}$") selection circuit 288 are under the direct control of the tape decoding circuit 147. These circuits may be caused to function depending upon the codes in the tape, and affect the tape decoding circuit. For example, let it be assumed that an adjustment is to be made in the carriage, moving it three and five-sixteenths inches ($3\frac{5}{16}$") to the left of its present position. There will be present in the tape, three codes, one representing three inches (3") another code representing one-quarter inch (¼") and the third code representing one-sixteenth of an inch ($\frac{1}{16}$"). Associated with the circuits 286, 287 and 288, are transfer circuits 289, 290 and 291 respectively. These circuits are under the control of the pulse counting circuit 285 and will function in a given order.

Referring again momentarily to the circuits 286, 287 and 288, these are hereinafter described as including given numbers of relays. Each of these circuits will be closed depending upon the measured distances the carriage is to be moved. As soon as these circuits are set up and the predetermined relays operated, solenoid 127 will be operated to connect the clutch 122—123 to start movement of the carriage to the left. At the same time the cams 276, 277 and 278 will be caused to rotate simultaneously. However, at the beginning of the rotation, the cam 276 is the only one of the three which will be effective to send pulsations into the pulse counting circuit limited by the condition of the circuit 286. After the completion of the arrangement set up in the circuit 286, the control will be transferred by the circuit 289 to the circuit 287. At this time the cam 276 is ineffective with the cam 277, and the cam 278 sends pulsations into the circuit 285, the number of pulsations that the circuit 285 will receive being predetermined by the condition set up by the circuit 287. When this condition is in effect the control is transferred to circuit 288, which brings into effect the cam 277, rendering the other cams ineffective. At this time the pulsation received by the circuit 285 is controlled by the condition set up in circuit 288. When this function has been completed, a stop circuit 292 is caused to function to immediately stop actuation of the cams by deenergizing the clutch solenoid 127 and cause application of the brake 137—138 through the energization of the solenoid 139, stopping the carriage to locate a given portion of the work at the operating position. For a more specific description of these circuits, attention is now directed to Figs. 11 and 12.

First, however, there are shown in Fig. 15 single lines extending from the tape decoding circuit 147 to the selection circuits 286, 287 and 288, but it should be understood that these lines represent cables each constituting a plurality of conductors extending to their respective terminals which are shown in Figs. 11 and 12. For example, in the present instance the cable leading to the circuit 286 includes conductors which extend to terminals 294 to 298 inclusive, the cable extending to the circuit 287 includes electrical conductors connected to terminals 299 to 303 inclusive, while the cable extending to the circuit 288 includes conductors connected to terminals 304 to 308 inclusive. This completes the electrical connections of the three selection circuits with the tape decoding circuit, so that the codes in the tape for these individual circuits may be decoded and cause given relays of the circuits to operate.

Considering the former example of adjusting the carriage to the left three and five-sixteenths inches ($3\frac{5}{16}''$), the first function of the tape decoding circuit will be to ground terminal 297 and cause relay 312 to operate. Relay 312 operated, will lock to the common ground lead under the control of relay 326 normal. The next function of the tape decoding circuit will be to ground terminal 300, which will cause relay 315 to operate and lock to the common ground lead under the control of relay 326. The third function of the tape decoding circuit will be to ground terminal 305, causing relay 320 to operate, which also locks to the common ground lead. The operation of relay 312 closes ground to lead 327. Relay 315 operated, closes ground from lead 327 to lead 328, and relay 305 operated, closes ground from lead 328 to lead 329. Ground on lead 329 through relay 326 normal, will supply ground to the cam brushes 330, 331 and 332, and also to continue ground through ST lead (Fig. 13) to operate relay 348. This starts movement to the left of the carriage and rotation of cams 276, 277 and 278. Thus it can be seen that any relay in the 309 to 313 inclusive series and the 314 to 318 inclusive series, as well as the 319 to 323 inclusive series will cause the clutch mechanism to function to start the movement of the carriage with the work and rotation of the cams. Cam 276 rotates, the high point thereof closing contacts 330, connecting ground to lead 302 through relay 324 normal, to operate relay 333 of the pulse counting circuit. The operation of relay 333 closes ground from relay 326 normal to the lower winding lead of the relay 334, but relay 334 does not operate at this time due to the ground on the upper winding lead thereof supplied by the cam contacts 330. When the low point of cam 276 is under cam contact 330, the ground is removed from the upper winding lead of relay 334 and relay 334 operates in series with the battery winding of relay 333 to ground on the normal contacts of relay 334. The operation of relay 334 transfers the lead 302 to the windings of relays 335 and 336, so that when the next closure of the cam contacts is made by the rotation of the cam 276, ground will be connected to the winding of relay 335 which operates. Relay 335 in operating, connects ground to the inner terminal of relay 336 which, like relay 334, does not operate at this point. Removal of ground from lead 302 by the rotation of the cam 276 removes the ground from relay 336 and relay 336 operates in series with relay 335. Relay 336 in operating, transfers lead 302 to the windings of relays 337, which operate. Relay 337 in operating, closes ground through the operated contacts of relay 312 which was operated from the tape decoding circuit as previously described, to operate relay 324, which locks to ground on the LC lead of Figs. 13 and 14. Relay 324 operated, removes the holding ground from relay 333 to relay 340, which will release any relays in this series that are operated. Relay 324 also supplies ground to operate slow-operating relay 341. Relay 324 operated, connects ground to SR—1 lead, to reduce the speed at which the cams rotate. This is accomplished through the operation of relay 360 to open a shunt circuit 361 to introduce a resistance 362 into the circuit for the motor 120. Relay 324 operated, also transfers lead 302 from cam contact 330 to cam contacts 331, rendering cam contact 330 ineffective. Relay 324 also closes battery to the winding of relay 325 and transfers the locking path from relay 324 normal through relay 325 normal to relay 341 operated. The transfer of lead 302 to cam contacts 331 will, when the first high portion of cam 277 appears under the cam contact 331, connect ground through relay 325 normal, through relay 324 operated, to again operate relay 333. Relay 333 operated, in this case connects ground through the operated contacts of relay 315 which has been operated, as previously described, from the tape decoding circuit, to operate relay 325 which locks to the LC lead of Fig. 13 and into Fig. 14. Relay 325 operated, removes the locking ground from the closed contacts of relay 341 to cause any relay in the 333 to 339 series of relays to release. It also closes ground to operate relay 342, connects battery to the winding of relay 326, connects ground to the SR—2 lead to further reduce the speed of the cams, and transfers lead 302 from cam contact 331 to cam contact 332. At this point relay 363 is operated to open shunt circuit 364 to add another resistance 365 to the circuit for the motor 120. Relay 342 operated, re-closes locking ground of relays 333 to 340 inclusive through relays 324 and 325 operated. The first closure of cam contact 332 under this condition closes ground through relay 326 normal, relays 325 and 324 operated, to lead 302, to reoperate lead 333. Relay 333 operated, in this condition closes ground through relay 320 operated, to operate relay 326, which locks to ground on the LC lead. Relay 326 operated, removes the ground from the common ground lead to release any relay 294 to 308 inclusive that is operated. It also removes the ground from the ST lead of relay 348 of Fig. 13 to deenergize the clutch operating solenoid 127, which stops any further movement of the cams and the carriage. Relay 326 also removes locking ground from relays 333 to 340 inclusive which, if operated, release, and finally connects ground to the PH lead of Fig. 13 through to Fig. 14 to operate relay 352.

Referring now to Figs. 13 and 14, the operation of a start key 345 operates relay 346, locks to ground on its own contacts. Relay 346 operated, supplies ground to the G lead and battery through relay 347 normal to the B lead. This battery and ground connected to the B and G leads respectively, start the indexing of the tape and transmitter. When the positioning circuits connect ground to their respective ST leads, one of the four relays in the 348 to 351 inclusive series will be operated. Any one of these relays in operating, removes ground from their respective brake solenoid and connects ground to its corresponding clutch solenoid to start the movement of the driving shaft and the rotation of the cams. After the tape decoding circuit sends its impulses to position the circuits (Fig. 11), as previously described, the code on the tape will operate relay 347. Relay 347 operated, locks to ground on contacts of normal relay 343 and removes battery from the tape transmitter to stop the indexing of the tape until the positioning circuits have completed their functions, or until the 352 to 355 relays have been directly set up by the tape. When the positioning circuits have completed their functions, ground will be supplied over the PH leads associated with each positioning circuit, to operate relays 352 to 355 inclusive. The operation of these relays closes ground from the SS lead of Figs. 8 and 14, to actuate the solenoid 343, which causes actuation of the selected tool at the operating position through the operation of the solenoid 376 (Figs. 2 and 14) and a clutch 377. Relay 343 operating, removes ground from the LC lead. This removal of ground releases relays 324 to 326 inclusive in Fig. 10 and relay 347 in Fig. 14. Thus all circuits in Figs. 9 and 10 are returned to normal, conditioning these circuits for the next series of operations. Relay 347 released, restores battery to the B lead and the tape transmitter again functions to set up the positioning circuits for the next operation. As the tape is arranged in a series of steps, one step for each hole to be perforated in the work, the first two-letter code of each step actuates the station selection circuit of Fig. 10. This is followed by two-letter codes to set up circuits 149 to 152 inclusive, as required, to position the work at the selected station. After the positioning codes have been transmitted, the code is sent to Fig. 14 to operate relay 347. Relay 347 operated, opens the B lead of the transmitter and stops the indexing of the tape. When the station selection circuit 148 and the positioning circuits 149 to 152 inclusive have completed their functions, relays 352 to 355 inclusive are operated as previously described, to actuate the tool operating mechanism. After the tool operating mechanism has completed its function, the action of the circuit in succeeding steps of the tape is the same as described until the last two-letter code on the tape has been reached, at which point the tape will cause relay 356 to operate. Relay 356 operated, removes battery from relay 346, which releases. Relay 346 released, removes battery and ground from the transmitter and the tape stops indexing. Relay 356 in operating, causes operation of an audible alarm 375 to indicate the end of a series of operations.

Key 357 and relay 358 are provided to index the tape to the starting position when the unperforated section of the tape is over the sensing fingers of the transmitter. Key 357 operated, operates relay 358 which locks to ground under the control of relay 359. Relay 358 operated, also supplies battery and ground to the transmitter, to index the tape to the first two-letter code. The first two-letter codes of each tape will always operate relay 359. The function of relay 359 operated is to insure that the control circuit is in the normal position before starting a cycle of operation. This is accomplished by having relay 359 operated, removing battery from the winding of relay 346 and locking ground from relay 358. Both of these relays will release if operated. Relay 359 operated, also supplies battery and ground to index the tape off the first two-letter code, at which time relay 359 releases. Relay 359 released, removes the battery and ground from the tape transmitter and stops further indexing of the tape.

Fig. 6 illustrates but a fragmentary portion of the tape 146. This tape for convenience is formed in an endless loop, leaving a plain unperforated portion between the beginning of the perforations or codes and the last group of perforations, creating a final operation on the selected work.

As heretofore stated, the positioning circuits 149 to 152 inclusive are identical excepting the portions of the adjusting mechanism they operate. Furthermore, they are under the control of the tape and when a code is present in the tape to cause their selection through the tape decoding circuit, they will be caused to function. Of course, not more than two of the positioning circuits will function at one time, that is, the carriage will either be moved to the left or to the right and the machine will either be moved forwardly or backwardly. It has been described how the left positioning circuits functioned under the control of the tape to move the carriage a given distance to the left. In a similar manner the suggested distance of one and nine-sixteenths inches (1 9/16") for the movement rearwardly of the machine may be performed through the same type of circuits shown in Figs. 11 and 12, to effectively measure, through the aid of these circuits, the given distance and cause the machine to move that distance. As soon as the backward positioning circuit starts functioning, the motor 86, which is constantly driven, will be operatively connected to the adjusting screw or threaded shaft 108 through the operation of the solenoid 92, to close the clutch 88—94 and thus start the movement of the machine in the given direction. At the same time the cams 269 to 271 inclusive are driven to respectively carry out their functions with their measuring circuits. When the machine has been moved the measured distance, the solenoid 92 will be deenergized, effecting disconnection of the clutch, and at the same time the brake 101—102 will be applied through the energization of the solenoid 103. This completes the two suggested adjustments of the carriage and the machine to position the first point of the material at the operating position 28. In the description of the left positioning circuit, the PH lead of Fig. 14 has been described as extending to the circuit controlling the relay 352. Also, the SS lead in this figure extends from the station selection circuit as being under the control of the upper contact relay 352. After the completion of the functions of the backward positioning circuit, the PH lead under the control thereof will cause operation of relay 355 to close its contacts. In the present instance, the right positioning circuit and the forward positioning circuit do not function but through codes in the tapes circuits are completed to the code points CR and CF, causing operation of relays 353 and 354 to close their respective contacts. As a result, through the chain of contacts of these relays, relay 343 is connected to ground and thus operated. Thus through this arrangement, that is the necessary closing of the chain of contacts, it is necessary for the selected punch to be moved into operating position and for the necessary adjustments of the carriage or the machine to be completed prior to the actuation of the selected tool. The operation of the selected tool is caused through the operation of the relay 343, completing the circuit through solenoid 376 (Figs. 2 and 14), which is adapted to cause operation of a one-revolution clutch 377 to operatively connect the shaft 30 with a pulley-type fly wheel 410 which is constantly driven through a motor 31 and its driven connection 32. Through this connection the selected tool 21 and its companion tool or die 37 are caused to function to punch the first hole in the panel or material.

Upon viewing Fig. 13, it will be observed that the leads for the various positioning circuits are identified, those for the left positioning circuits being completed in the present instance. With the other leads extending to measuring or positioning circuits identical with those shown in Figs. 11 and 12, through the control of the tape these circuits may, in a given order, cause connection with their respective motors 86 and 120, to bring about desired adjustments of the carriage and machine. It has been described how the motor 120 is driven on its associated mechanism to move the carriage three and five-sixteenths inches (3 5/16″). At the same time the motor 86 may be operatively connected to the machine adjusting means to carry out its adjustment. In a similar manner relays 360′ and 363′ may be operated through the functioning of the backward positioning circuit to respectively, at given time intervals, introduce resistances 362′ and 365′ into the circuit for the motor 86, decreasing the speed of the motor and the adjusting means for the driving of the cam shaft 267 at varied speeds to produce the same length of pulse for the respective cams 269 to 271 inclusive.

In an attempt to simplify what might otherwise be a repetition in description of four substantially identical circuit arrangements, namely the positioning circuits, the disclosure has purposely been limited to the showing and description of but one of these circuits, which is believed sufficient for a clear understanding of the invention. Attention is directed to the fact, however, that each of these positioning circuits has its functions to perform, namely the causing of adjustment of the carriage to the right or left, or the machine forwardly or rearwardly varied distances, depending on the predisposed codes in the tape. However, only one each of the carriage and machine positioning circuits will function at one time. The others remain idle or inactive, codes being present in the tape, however, to by-pass these circuits to close their associated relays of the group 352 to 355 inclusive, so that the chain of contacts associated therewith and the other of the circuits are functioned to eventually place ground on the relay 343. Thus, there are two adjusting means controlled by these circuits, one for the carriage and the other for the machine, necessitating two identical groups of cams 269 to 271 inclusive and 276 to 278 inclusive, the cams in each of these groups having cam contacts for their respective positioning circuits. Through the operation of the adjusting means, the cams are driven, yet only the positioning circuits which are rendered effective through the codes in the tape are affected by their respective set of contacts, the other sets of contacts in each instance being ineffective.

Although specific improvements of the invention have been shown and described, it will be understood that they are but illustrative and that various modifications may be made therein without departing from the scope and spirit of this invention as defined by the appended claims.

What is claimed is:

1. A control device for a material working machine having a turret of operable material working tools, means to select one of the plurality of tools, a carriage for material and mechanism operable to cause relative movement of the carriage and the turret of tools, the control device comprising an element adapted to cause the operable mechanism to move the carriage a given distance in one direction and to move the tools a given distance in another direction to position the selected tool adjacent a given point of the material, and means to cause actuation of the selected tool.

2. A control device for a material working machine having a turret of operable material working tools, means to select one of the plurality of tools, a carriage for material and mechanism operable to cause relative movement of the carriage and the turret of tools, the control device comprising an element adapted to cause the operable mechanism to move the carriage a given distance in one direction and to move the tools a given distance in another direction to position the selected tool adjacent a given point of the material, and means under the control of the element to cause operation of the selected tool.

3. A control device for a material working machine having operable material working tools, a turret for the tools and a carriage for material, the control device comprising a mechanism operable to move the turret in a given direction to select one of the plurality of tools, a mechanism operable to move the carriage in a different direction, a control element, and means under the control of the element to operate the said mechanisms to cause positioning of a given point of the material adjacent the selected tool.

4. A control device for a material working machine having operable material working tools, a turret for the tools and a carriage for material, the control device comprising a mechanism operable to move the turret in a given direction to select one of the plurality of tools, a mechanism operable to move the carriage in a different direction, a control element, means controlled by the element to cause the carriage to move a given distance in one direction, and means controlled by the element to cause the turret to move a given distance in another direction, the combined movements of the carriage and the support causing the positioning of a given point of the material adjacent the selected tool.

5. A control device for a material working machine having operable material working tools, a turret for the tools movable relative to an operating position, means to select any one of the tools, and a support for material, the control device comprising a control element, and means under the control of the element to move the turret to locate any one of the tools at the operating position.

6. A control device for a material working machine having operable material working tools, a turret for the tools movable relative to an operating position, means to select any one of the tools, and a support for material, the control device comprising a control element, and means under the control of the element to intermittently move the turret to successively move selected tools to the operating position.

7. A control device for a material working machine having operable material working tools, a support therefor movable relative to an operating position, and a support for material, the control device comprising a control element, means under the control of the element to successively move selected tools to the operating position, and means under the control of the element to cause actuation of the tools in their successive order.

8. A control device for a material working machine having operable material working tools, a support therefor movable relative to an operating position, and a support for material, the control device comprising a control element, means under the control of the element to cause relative movement of the supports to cause location of a given point of the material at the operating position, and means controlled by the element to move the tool support to locate a given one of the tools at the operating position.

9. A control device for a material working machine having operable material working tools, a support therefor movable relative to an operating position, and a support for material, the control device comprising a control element, means under the control of the element to cause relative movement of the supports to cause location of a given point of the material at the operating position, means under the control of the element to subsequently cause relative movement of the supports to cause a second point of the material a measured distance from the first point to be located at the operating position, and means under the control of the element to cause given ones of tools to successively operate on the material at the said points.

10. A control device for a material working machine having operable material working tools, a support therefor movable relative to an operating position, and a support for material, the control device comprising a control element, means under the control of the element to cause relative movement of the supports to cause location of a given point of the material at the operating position, means under the control of the element to subsequently cause relative movement of the supports to cause a second point of the material a measured distance from the first point to be located at the operating position, and means intermittently operable under the control of the element to cause movement of the tool support to successively locate selected ones of the tools at the operating position.

11. A control device for a material working machine having operable material working tools, a support therefor movable relative to an operating position, and a support for material, the control device comprising a control element, and means under the control of the element to cause successive movements of the tool support to successively present certain of the tools in a given order to the operating position.

12. A control device for a material working machine having operable material working tools, a support therefor movable relative to an operating position, and a support for material, the control device comprising a control element, means under the control of the element to cause successive movements of the tool support to successively present certain of the tools in a given order to the operating position, and means to control the direction of movement of the tool support.

13. A control device for a material working machine having operable material working tools, a support therefor movable relative to an operating position, and a support for material, the control device comprising a control element, means under the control of the element to cause successive movements of the tool support to successively present certain of the tools in a given order to the operating position, and means operable to limit each of the said movements of the tool support to the shortest movable distance between the next selected tool and the operating position.

14. A control device for a material working machine having a tool operating unit, a tool supporting turret movable to singly present a plurality of tools to the unit, a support for material, and adjustable means adapted to cause relative movement of the support and unit, the control device comprising an element bearing selected groups of codes, and electrically operable means under the control of codes in the tape to cause actuation of the adjustable means to successively present given points of the material in alignment with the unit.

15. A control device for a material working machine having a tool operating unit, a tool supporting turret movable to singly present a plurality of tools to the unit, a support for material, and adjustable means adapted to cause relative movement of the support and unit, the control device comprising an element bearing selected groups of codes, electrically operable means under the control of codes in the tape to cause actuation of the adjustable means to successively present given points of the material in alignment with the unit, and electrically operable means under the control of codes in the tape to cause movement of the turret to successively present predetermined tools thereof to the unit for operation on the successively presented points of the material.

16. A control device for a material working machine having a tool operating unit, a tool supporting turret movable to singly present a plurality of tools to the unit, a support for material, and adjustable means adapted to cause relative movement of the support and unit, the control device comprising an element bearing selected groups of codes, electrically operable means under the control of codes in the tape to cause actuation of the adjustable means to successively present given points of the material in alignment with the unit, electrically operable means under the control of codes in the tape to cause movement of the turret to successively present predetermined tools thereof to the unit for operation on the successively presented points of the material, and means to limit each movement of the turret to the shortest movable distance between the successive tools and the unit.

17. A control device for a material working machine having a tool operating unit, a tool supporting turret movable to singly present a plurality of tools to the unit, a support for material, and adjustable means adapted to cause relative movement of the support and unit, the control device comprising an element bearing selected groups of codes, electrically operable means under the control of codes in the tape to cause actuation of the adjustable means to successively present given points of the material in alignment with the unit, electrically operable means under the control of codes in the tape to cause movement of the turret to successively present predetermined tools thereof to the unit for operation on the successively presented points of the material, and means rendered effective at the completion of the associated movements of the turret, unit and support to cause actuation of the unit.

18. A control device for a material working machine having operable material working tools, a movable support for the tools, a carriage for material and mechanism operable to cause relative movement of the carriage and tools, a tool support to successively position selected ones of the tools singly relative to given positions on the material, the control device comprising a tape having successive code apertures therein disposed laterally thereof and spaced longitudinally of the tape for determining the nature of a plurality of operations to be performed by the successively selected tools at the given positions on the material, a tape decoding unit, and means selectively controlled through the decoding unit, dependent upon the selection and arrangement of the codes in the tape, for successively initiating the selected operations.

19. A control device for a material working machine having operable material working tools, a movable support for the tools, a carriage for material and mechanism operable to cause relative movement of the carriage and a tool support to successively position selected ones of the tools singly relative to given positions on the material, the control device comprising a tape having successive code apertures therein disposed laterally thereof and spaced longitudinally of the tape for determining the nature of a plurality of operations to be performed by the successively selected tools at the given positions on the material, a tape decoding unit, means controlled through the decoding unit, dependent upon the selection and arrangement of certain of the codes in the tape, to cause, through the operable mechanism, relative movement of the carriage and the tool support to cause registration of the first selected tool with a given portion of the material, and means controlled through the decoding unit and another code in the tape to cause actuation of the selected tool.

20. A control device for a material working machine having operable material working tools, a movable support for the tools, a carriage for material and mechanism operable to cause relative movement of the carriage and a tool support to successively position selected ones of the tools singly relative to given positions on the material, the control device comprising a tape having successive code apertures therein disposed laterally thereof and spaced longitudinally of the tape for determining the nature of a plurality of operations to be performed by the successively selected tools at the given positions on the material, a tape decoding unit, means controlled through the decoding unit, dependent upon the selection and arrangement of certain of the codes in the tape, to cause, through the operable mechanism, relative movement of the carriage and the tool support to cause registration of the first selected tool with a given portion of the material, and means controlled through the decoding unit and another code disposed in the tape subsequent to the aforesaid codes to cause actuation of the selected tool subsequent to the relative movement of the carriage and tool.

21. A control device for a material working machine having operable material working tools, a support therefor movable relative to an operating position, and a support for material, the control device comprising a tape having successive codes therein spaced longitudinally thereof for selected tools, a decoding unit, and means under the control of the decoding unit to move the tool support to successively locate any one of the tools at the operating position depending upon the positions of the tool codes in the tape.

22. A control device for a material working machine having operable material working tools, a support therefor movable relative to an operating position, and a support for material, the control device comprising a tape having successive codes therein spaced longitudinally thereof for selected tools, a decoding unit, means under the control of the decoding unit to move the tool support to successively locate any one of the tools at the operating position depending upon the positions of the tool codes in the tape, and means under the control of the decoding unit to cause actuation of the tool at the operating position.

23. A control device for a material working machine having an operating position and a support for material, the control device comprising operable means adapted to cause relative movement of the support and the said operating position, electrical selection circuits adapted to cause operation of the said means for varied intervals of time to cause the said relative movement to continue varied measured distances, means operable in synchronism with the power means to create electrical pulses of varied intervals in the selection circuits, and means to render a selected number of the said pulses effective to control the selection circuits.

24. A control device for a material working machine having an operating position and a support for material, the control device comprising operable means adapted to cause relative movement of the support and the said operating position, electrical selection circuits adapted to cause operation of the said means for varied intervals of time to cause the said relative movement to continue varied measured distances, means operable in synchronism with the power means to create electrical pulses of varied intervals in the selection circuits, and a tape having a selected number of codes therein to render a given number of the said pulses effective to control the selection circuits.

25. A control device for a material working machine having an operating position and a support for material, the control device comprising operable means adapted to cause relative movement of the support and the said operating position, electrical selection circuits adapted to cause operation of the said means for varied intervals of time to cause the said relative movement to continue varied measured distances, and means to repeatedly close certain of the selection circuits a given number of times to cause the said relative movement to continue a given number of the measured distances.

26. A control device for a material working machine having an operating position and a support for material, the control device comprising operable means adapted to cause relative movement of the support and the said operating position, electrical selection circuits adapted to cause operation of the said means for varied intervals of time to cause the said relative movement to continue varied measured distances, a tape having codes therein, and a decoding unit causing closure of certain of the selection circuits and electrically by-passing the remaining circuit or circuits.

JOHN H. SULZER.